United States Patent
Ohnacker et al.

[15] 3,691,173
[45] Sept. 12, 1972

[54] N-SUBSTITUTED 1,2,3,4,4α,10α-HEXAHYDRO-(10H)-1-BENZOPYRANO-[3,2,C]-PYRIDINES

[72] Inventors: Gerhard Ohnacker; Helmut Daniel; Hans Machleidt, all of Biberach, Germany

[73] Assignee: Boehringer Ingelheim G.m.b.H., Ingelheim/Rhein, Germany

[22] Filed: June 20, 1968

[21] Appl. No.: 738,398

[30] Foreign Application Priority Data

June 21, 1967 Germany..................T 34142

[52] U.S. Cl...........260/293.55, 424/267, 260/296 R, 260/570.9, 260/293.89, 260/293.65, 260/293.8, 260/293.86, 260/293.76

[51] Int. Cl. .............................................C07d 39/00

[58] Field of Search...................260/294.7 C, 293.55

[56] References Cited

UNITED STATES PATENTS

| | | |
|---|---|---|
| 1,915,334 | 6/1933 | Salzberg et al. ............260/243 |
| 2,075,359 | 3/1937 | Salzberg et al. ............424/250 |
| 2,809,201 | 10/1957 | Koelsch ..............260/294.7 C |

*Primary Examiner*—Henry R. Jiles
*Assistant Examiner*—S. D. Winters
*Attorney*—Hammond & Littell

[57] ABSTRACT

The compounds are N-substituted 4a-oxy-1,2,3,4,-4a,10a-hexahydro-(10H)-1-benzopyrano-[3,2-c]-pyridines, useful as sedatives and antiphlogistics in warm-blooded animals.

4 Claims, No Drawings

N-SUBSTITUTED 1,2,3,4,4a,10a-HEXAHYDRO-(10H)-1-BENZOPYRANO-[3,2,C]-PYRIDINES

This invention relates to novel substitution products of 1,2,3,4,4a,10a-hexahydro-(10H)-1-benzopyrano-[3,2-c]-pyridines, as well as to various methods of preparing these compounds.

More particularly, the present invention relates to compounds of the formula

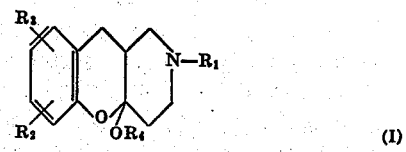

wherein $R_1$ is straight or branched chain lower alkyl, lower alkenyl, lower alkinyl, cyclopropyl-lower alkyl, aralkyl, lower aliphatic acyl (such as acetyl), or araliphatic acyl (such as β-phenylacetyl), $R_2$ and $R_3$, which may be identical to or different from each other, are each hydrogen, halogen, lower alkyl or lower alkoxy, and $R_4$ is hydrogen or lower alkyl.

The compounds according to the present invention may be prepared by a number of different methods involving well known chemical principles, among which the following have proved to be particularly efficient and convenient:

METHOD A

For the preparation of a compound of the formula I wherein $R_4$ is hydrogen, by reacting a 4-basic substituted-1,2,3,6-tetrahydro-pyridine of the formula

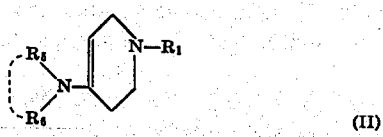

wherein $R_1$ has the same meanings as in formula I and $R_5$ and $R_6$ are each any desired aliphatic, araliphatic or aromatic radical or, together with each other and the nitrogen atom to which they are attached, form any desired basic heterocyclic ring, with an o-aminomethyl-phenol of the formula

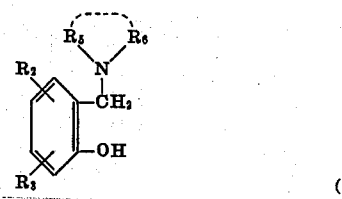

wherein $R_2$ and $R_3$ have the same meanings as in formula I and $R_5$ and $R_6$ have the same meanings as in formula II.

Most advantageously, equimolar amounts of compounds II and III are provided for the reaction, and it is preferably carried out in the presence of an inert organic solvent and at temperatures between 100° and 200°C. in an inert gas atmosphere, followed by heating with an inorganic or organic acid and subsequent neutralization of the reaction mixture, whereupon the reaction product precipitates out. Examples of suitable inert organic solvents are benzene, chlorobenzene, toluene, ethylacetate and dibutylether.

METHOD B

By reacting a 1,2,3,4,4a,10a-hexahydro-(10H)-1-benzopyrano-[3,2-c]-pyridine of the formula

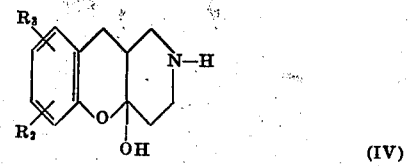

wherein $R_2$ and $R_3$ have the same meanings as in formula I, with a compound of the formula

wherein $R_1$ has the same meanings as in formula I and X is the radical of a reactive ester, such as halogen, aromatic sulfonyl or, if $R_1$ is acyl, acyloxy.

The reaction is preferably carried out in the presence of an inert organic solvent, such as acetone, ethanol or benzene, at temperatures up to the boiling point of the particular solvent which is used, and in the presence of a base, if necessary.

If the compound of the formula V is an alkylating agent, the free hydroxyl group in the 4a-position may simultaneously be alkylated by providing a commensurate excess of compound V; thus, for example, the simultaneous alkylation of the hydroxyl group may be effected with a hydrogen halide-containing alcohol at temperatures around 100°C. in an autoclave.

In those instances where either of the above methods yields a compound of the formula I wherein $R_4$ is hydrogen, which is always the case with method A, the 4a-hydroxyl group may, if desired, be subsequently converted into a lower alkoxy group pursuant to customary procedures; examples of suitable alkylating agents are alkylhalides, alkylsulfates or hydrogen halide-containing solutions of the corresponding alcohols. The alkylation is advantageously carried out at temperatures around 100°C. and under elevated pressure.

A compound of the formula II, which is needed as a starting material for method A, may be prepared by react-ing a piperidone-4 of the formula

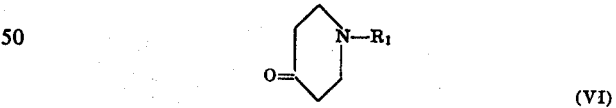

wherein $R_1$ has the same meanings as in formula I, with a secondary amine of the formula

wherein $R_5$ and $R_6$ have the same meanings as in formula II; see also J. Szmuszkovicz in *Advances in Organic Chemistry*, Vol. 4, Interscience Publishers, New York/London, 1963.

The o-aminomethyl-phenols of the formula III are described in the literature; see, for instance, H. Hellmann, α-Aminoalkylierung, Verlag Chemie, Weinheim, Germany (1960).

A compound of the formula IV may be obtained by reacting a 4-basic substituted-1,2,3,6-tetrahydropyridine of the formula II, wherein $R_1$ is a protective group for secondary amines, such as acyl, benzyl, carbobenzoxy or carbamoyl, with an o-aminomethyl-phenol of the formula III, and subsequently removing the protective group by well known methods, such as by acid hydrolysis or hydrogenation.

The following examples further illustrate the present invention and will enable others skilled in the art to understand it more completely. It should be understood, however, that the invention is not limited solely to the particular examples given below.

EXAMPLE 1

Preparation of 2-allyl-4a-hydroxy-6-methyl-1,2,3,4,4a,10a-hexahydro-(10H)-benzopyrano-[3,2-c]-pyridine by method A 13.9 gm (0.1 mol) of N-allyl-piperidone-4 and 7.1 gm (0.1 mol) of pyrrolidine were dissolved in 100 cc of benzene, and the solution was boiled until substantially the calculated amount of water had been split off and collected, yielding a solution of 1-allyl-4-pyrrolidino-1,2,3,6-tetrahydro-pyridine in benzene. The solvent was distilled off, the residue was dissolved in 200 cc of chlorobenzene, 19.3 gm of 2-methyl-6-diethylaminomethylphenol were added thereto, and the mixture was heated for 16 hours on an oil bath (160°–165°C.) while stirring and passing nitrogen through the vessel. Thereafter, the chlorobenzene was distilled off in vacuo, the residue was admixed with 150 cc of 2N hydrochloric acid, and the acid mixture was refluxed for 5 hours. Subsequently, the reaction solution was allowed to cool and was then neutralized with sodium hydroxide. An oily product separated out, which slowly crystallized upon standing. Additional reaction product was recovered from the aqueous phase by ether extraction. 14 gm (54 percent of theory) of 2-allyl-4a-hydroxy-6-methyl-1,2,3,4,4a,10a-hexahydro-(10H)-benzopyrano-[3,2-c]-pyridine, m. p. 99°–101°C. (recrystallized from acetone), of the formula

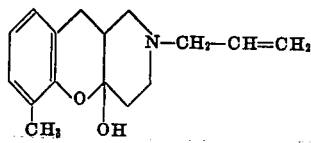

were obtained.

EXAMPLE 2

Preparation of 2-propargyl-4a-hydroxy-6-methyl-1,2,3,4,4a,10a-hexahydro-(10H)-1-benzopyrano-[3,2-c]-pyridine by method B a. 4a-Hydroxy-6-methyl-1,2,3,4,4a,10a-hexahydro-(10H)-1-benzopyrano-[3,2-c]-pyridine A mixture of 19.4 gm (0.1 mol) of 1-acetyl-4-pyrrolidino-1,2,3,6-tetrahydro-pyridine and 19.3 gm (0.1 mol) of 2-methyl-6-diethylaminomethyl-phenol was heated for 8 hours at 150°–160°C. on an oil bath while passing nitrogen through the vessel. Thereafter, 90 cc of 10N hydrochloric acid were added, and the mixture was again heated for 5 hours in an atmosphere of nitrogen. Subsequently, the reaction solution was allowed to cool and was then made alkaline with a saturated aqueous solution of sodium bicarbonate. The alkaline mixture was extracted with chloroform, the extract solution was dried over sodium sulfate, and the chloroform was evaporated, leaving an oily residue which crystallized upon treatment with petroleum ether. 5 gm (23 percent of theory) of 4a-hydroxy-6-methyl-1,2,3,4,4a,10a-hexahydro-(10H)-1-benzopyrano-[3,2-c]-pyridine, m. p. 130°–132°C. (recrystallized from ethylacetate), were obtained.

b. 2-Propargyl-4a-hydroxy-6-methyl-1,2,3,4,4a,10a-hexahydro-(10H)-benzopyrano-[3,2-c]-pyridine A mixture of 21.9 gm (0.1 mol) of 4a-hydroxy-6-methyl-1,2,3,4,4a,10a-hexahydro-(10H)-1-benzopyrano-[3,2-c]-pyridine, 20.8 gm (0.15 mol) of potassium carbonate, 250 cc of acetone and 14.3 gm (0.12 mol) of propargyl bromide was stirred and refluxed for 20 hours. Thereafter, the potassi-um salts formed by the reaction were filtered off and the acetone was distilled out of the filtrate in vacuo, leaving an oily residue which crystallized upon addition of methanol. 18.5 gm (72 percent of theory) of 2-propargyl-4a-hydroxy-6-methyl-1,2,3,4,4a,10a-hexahydro-(10H)-1-benzopyrano-[3,2-c]-pyridine, m. p. 112°–114°C. (recrystallized from methanol), of the formula

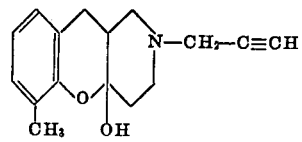

were obtained.

EXAMPLE 3

Preparation of 2-allyl-4a-methoxy-6-methyl-1,2,3,4,4a,10a-hexahydro-(10H)-1-benzopyrano-[3,2-c]-pyridine by methylation of corresponding 4a-hydroxy compound 20 gm (0.077 mol) of 2-allyl-4a-hydroxy-6-methyl-1,2,3,4,4a,10a-hexahydro-(10H)-1-benzopyrano-[3,2-c]-pyridine were added to 600 cc of methanolic 2 percent hydrochloric acid, and the mixture was heated for 5 hours at 100°C. in an autoclave. Thereafter, the reaction mixture was made alkaline with 2N sodium hydroxide and then extracted with ether. The ether was distilled out of the extract solution, leaving 16 gm of an oily residue which was chromatographically separated in a silicagel column. Two isomeric forms of 2-allyl-4a-methoxy-6-methyl-1,2,3,4,4a,10a-hexahydro-(10H)-1-benzopyrano-[3,2-c]-pyridine were obtained, namely: 2 gm (9.5 percent of theory) of one isomer whose hydrochloride had a melting point of 213°–215°C., and 4.5 gm (21.5 percent of theory) of another isomer whose hydrochloride had a melting point of 206°–208 °C., both recrystallized from methyl ethyl ketone.

EXAMPLE 4

Using a procedure analogous to that described in Example 1, 38 percent of theory of 2-(β-phenyl-ethyl)-4a-hydroxy-8-methyl-1,2,3,4,4a,10a-hexahydro-(10H)-1-benzopyrano-[3,2-c]-pyridine, m. p. 131°–133°C. (recrystallized from isopropanol), of the formula

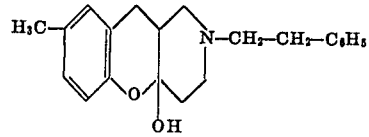

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 4-methyl-6-dimethylaminomethyl-phenol.

EXAMPLE 5

Using a procedure analogous to that described in Example 1, 39 percent of theory of 2-(β-phenyl-ethyl)-4a-hydroxy-7-methyl-1,2,3,4,4a,10a-hexahydro-(10H)-1-benzopyrano-[3,2-c]-pyridine, m. p. 140°–143°C. (recrystallized from ethanol), of the formula

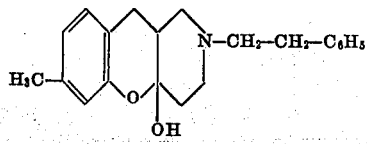

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 3-methyl-6-dimethylaminomethyl-phenol.

EXAMPLE 6

Using a procedure analogous to that described in Example 1, 25 percent of theory of 2-(β-phenyl-ethyl)-4a-hydroxy-6-methoxy-1,2,3,4,4a,10a-hexahydro-(10H)-1-benzopyrano-[3,2-c]-pyridine, m. p. 85°–87°C. (recrystallized from ethylacetate), of the formula

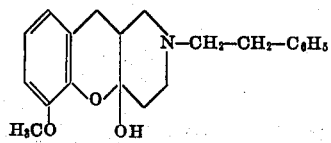

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 2-methoxy-6-dimethylaminomethyl-phenol.

EXAMPLE 7

Using a procedure analogous to that described in Example 1, 29 percent of theory of 2-(β-phenyl-ethyl)-4a-hydroxy-8-methoxy-1,2,3,4,4a,10a-hexahydro-(10H)-1-benzopyrano-[3,2-c]-pyridine, m. p. 127°–129°C. (recrystallized from ethylacetate), of the formula

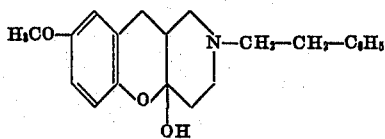

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 4-methoxy-6-dimethylaminomethyl-phenol.

EXAMPLE 8

Using a procedure analogous to that described in Example 1, 25 percent of theory of 2-(β-phenyl-ethyl)-4a-hydroxy-6-methyl-1,2,3,4,4a,10a-hexahydro-(10H)-1-benzopyrano-[3,2-c]-pyridine, m. p. 122°–124°C. (recrystallized from acetone) were obtained from 1-(β-phenyl-ethyl)-4-pyrrolidino-1,2,3,5-tetrahydro-pyridine [prepared by reacting equimolar amounts of β-phenylethyl-piperidone-(4) and pyrrolidine] and 2-methyl-6-diethylaminomethyl-phenol.

EXAMPLE 9

Using a procedure analogous to that described in Example 1, 22 percent of theory of 2-(β-phenyl-ethyl)-4a-hydroxy-8-chloro-1,2,3,4,4a,10a-hexahydro-(10H)-1-benzopyrano-[3,2-c]-pyridine, m. p. 152°–154°C. (recrystallized from methyl ethyl ketone), of the formula

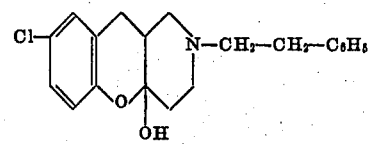

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 4-chloro-6-dimethylaminomethyl-phenol.

EXAMPLE 10

Using a procedure analogous to that described in Example 1, 12 percent of theory of 2-(β-phenyl-ethyl)-4a-hydroxy-7,9-dimethyl-1,2,3,4,4a,10a-hexahydro-(10H)-1-benzopyrano-[3,2-c]-pyridine, m. p. 206°–209°C. (recrystallized from iso-propanol), of the formula

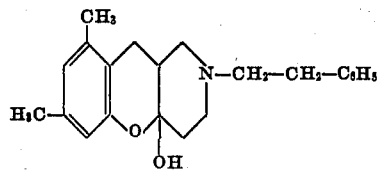

were obtained from 1-(β-phenyl-ethyl)-4-pyrrolidino-1,2,3,6-tetrahydro-pyridine [prepared by reacting equimolar amounts of β-phenylethyl-piperidone-(4) and pyrrolidine] and 3,5-dimethyl-6-diethylaminomethyl-phenol.

EXAMPLE 11

Using a procedure analogous to that described in Example 1, 49 percent of theory of 2,8-dimethyl-4a-hydroxy-1,2,3,4,4a,10a-hexahydro-(10H)-1-benzopyrano-[3,2-c]-pyridine, m. p. 155°–157°C. (recrystallized from methyl ethyl ketone), of the formula

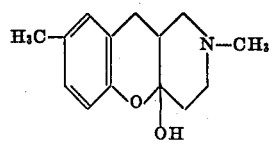

were obtained from 1-methyl-4-pyrrolidino-1,2,3,6-tetrahydro-pyridine [prepared by reacting equimolar amounts of N-methyl-piperidone-(4) and pyrrolidine] and 4-methyl-6-dimethylaminomethyl-phenol.

EXAMPLE 12

Using a procedure analogous to that described in Example 1, 23 percent of theory of 2,7-dimethyl-4a-hydroxy-1,2,3,4,4a,10a-hexahydro-(10H)-1-benzopyrano-[3,2-c]-pyridine, m. p. 139°–141°C. (recrystallized from methyl ethyl ketone), of the formula

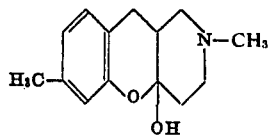

were obtained from 1-methyl-4-pyrrolidino-1,2,3,6-tetrahydropyridine [prepared by reacting equimolar amounts of N-methyl-piperidone-(4) and pyrrolidine] and 3-methyl-6-dimethylaminomethyl-phenol.

EXAMPLE 13

Using a procedure analogous to that described in Example 1, 11 percent of theory of 2-methyl-4a-hydroxy-8-chloro-1,2,3,4,4a,10a-hexahydro-(10H)-benzopyrano-[3,2-c]-pyridine, m. p. 176°–178°C. (recrystallized from ethylacetate) were obtained from 1-methyl-4-pyrrolidino-1,2,3,6-tetrahydropyridine [prepared by reacting equimolar amounts of N-methyl-piperidone-(4) and pyrrolidine] and 4-chloro-6-dimethylaminomethyl-phenol.

EXAMPLE 14

Using a procedure analogous to that described in Example 1, 26 percent of theory of 2-methyl-4a-hydroxy-8-methoxy-1,2,3,4,4a,10a-hexahydro-(10H)-1-benzopyrano-[3,2-c]-pyridine, m. p. 145°–147°C. (recrystallized from methyl ethyl ketone) were obtained from 1-methyl-4-pyrrolidino-1,2,3,6-tetrahydropyridine [prepared by reacting equimolar amounts of N-methyl-piperidone-(4) and pyrrolidine] and 4-methoxy-6-dimethylaminomethyl-phenol.

EXAMPLE 15

Using a procedure analogous to that described in Example 1, 35 percent of theory of 2,7,9-trimethyl-4a-hydroxy-1,2,3,4,4a,10a-hexahydro-(10H)-1-benzopyrano-[3,2-c]-pyridine, m. p. 206°–208°C. (recrystallized from methanol), of the formula

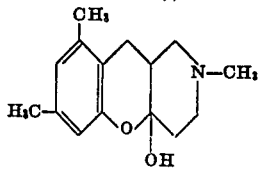

were obtained from 1-methyl-4-pyrrolidino-1,2,3,6-tetrahydro-pyridine [prepared by reacting equimolar amounts of N-methyl-piperidone-(4) and pyrrolidine] and 3,5-dimethyl-6-diethylaminomethyl-phenol.

EXAMPLE 16

Using a procedure analogous to that described in Example 1, 27 percent of theory of 2-allyl-4a-hydroxy-8-methyl-1,2,3,4,4a,10a-hexahydro-(10H)-1-benzopyrano-[3,2-c]-pyridine, m. p. 115°–116°C. (recrystallized from methyl ethyl ketone) were obtained from 1-allyl-4-pyrrolidino-1,2,3,6-tetrahydropyridine [prepared by reacting equimolar amounts of N-allyl-piperidone-(4) and pyrrolidine] and 4-methyl-6-dimethylaminomethyl-phenol.

EXAMPLE 17

Using a procedure analogous to that described in Example 1, 27 percent of theory of 2-allyl-4a-hydroxy-7-methyl-1,2,3,4,4a,10a-hexahydro-(10H)-1-benzopyrano-[3,2-c]-pyridine, m. p. 111°–113°C. (recrystallized from ethyl-acetate) were obtained from 1-allyl-4-pyrrolidino-1,2,3,6-tetrahydro-pyridine [prepared by reacting equimolar amounts of N-allyl-piperidone-(4) and pyrrolidine] and 3-methyl-6-dimethylaminomethyl-phenol.

EXAMPLE 18

Using a procedure analogous to that described in Example 1, 25 percent of theory of 2-allyl-4a-hydroxy-8-chloro-1,2,3,4,4a,10a-hexahydro-(10H)-1-benzopyrano-[3,2-c]-pyridine, m. p. 205°–208°C. (recrystallized from methanol) were obtained from 1-allyl-4-pyrrolidino-1,2,3,6-tetrahydro-pyridine [prepared by reacting equimolar amounts of N-allyl-piperidone-(4) and pyrrolidine] and 4-chloro-6-dimethylaminomethyl-phenol.

EXAMPLE 19

Using a procedure analogous to that described in Example 1, 16 percent of theory of 2-allyl-4a-hydroxy-6-methoxy-1,2,3,4,4a,10a-hexahydro-(10H)-1-benzopyrano-[3,2-c]-pyridine, m. p. 200°–202°C. (recrystallized from isopropanol) were obtained from 1-allyl-4-pyrrolidino-1,2,3,6-tetrahydro-pyridine [prepared by reacting equimolar amounts of N-allyl-piperidone-(4) and pyrrolidine] and 2-methoxy-6-dimethylaminomethyl-phenol.

EXAMPLE 20

Using a procedure analogous to that described in Example 1, 13 percent of theory of 2-allyl-4a-hydroxy-8-methoxy-1,2,3,4,4a,10a-hexahydro-(10H)-1-benzopyrano-[3,2-c]-pyridine, m. p. 209°–211°C. (recrystallized from isopropanol) were obtained from 1-allyl-4-pyrrolidino-1,2,3,6-tetrahydropyridine [prepared by reacting equimolar amounts of N-allyl-piperidone-(4) and pyrrolidine] and 4-methoxy-6-dimethylaminomethyl-phenol.

EXAMPLE 21

Using a procedure analogous to that described in Example 1, 16 percent of theory of 2-allyl-4a-hydroxy-7,9-dimethyl-1,2,3,4,4a,10a-hexahydro-(10H)-1-benzopyrano-[3,2-c]-pyridine, m. p. 192°–194°C. (recrystallized from ethanol) were obtained from 1-allyl-4-pyrrolidino-1,2,3,6-tetrahydropyridine [prepared by reacting equimolar amounts of N-allyl-piperidone-(4) and pyrrolidine] and 3,5-dimethyl-6-diethylaminomethyl-phenol.

EXAMPLE 22

Using a procedure analogous to that described in Example 1, 50 percent of theory of 2-allyl-4a-hydroxy-1,2,3,4,4a,10a-hexahydro-(10H)-1-benzopyrano-[3,2- c]-pyridine, m. p. 212°–214°C. (recrystallized from methanol) were obtained from 1-allyl-4-pyrrolidino-1,2,3,6-tetrahydropyridine [prepared by reacting equimolar amounts of N-allylpiperidone-(4) and pyrrolidine] and 6-dimethylaminomethylphenol.

EXAMPLE 23

Using a procedure analogous to that described in Example 1, 8 percent of theory of 2-(γ,γ-dimethylallyl)-4a-hydroxy-6-methyl-1,2,3,4,4a,10a-hexahydro-(10H)-1-benzopyrano-[3,2-c]-pyridine, m. p. 118°–120°C. (recrystallized from methyl ethyl ketone), of the formula

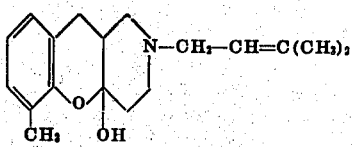

were obtained from 1-(γ,γ-dimethylallyl)-4-pyrrolidino-1,2,3,6-tetrahydro-pyridine [prepared by reacting equimolar amounts of N-(γ,γ-dimethylallyl)-piperidone-(4) and pyrrolidine] and 2-methyl-6-diethylaminomethyl-phenol.

EXAMPLE 24

Using a procedure analogous to that described in Example 1, 39 percent of theory of 2-cyclopropylmethyl-4a-hydroxy-6-methyl-1,2,3,4,4a,10a-hexahydro-(10H)-1-benzopyrano-[3,2-c]-pyridine, m. p. 240°–242°C. (recrystallized from methanol), of the formula

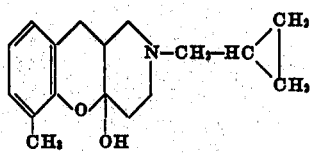

were obtained from 1-cyclopropylmethyl-4-pyrrolidino-1,2,3,6-tetrahydro-pyridine [prepared by reacting equimolar amounts of N-cyclopropylmethyl-piperidone-(4) and pyrrolidine] and 2-methyl-6-dimethylaminomethyl-phenol.

EXAMPLE 25

Preparation of 2,8-dimethyl-4a-hydroxy-1,2,3,4,4a,10a-hexahydro-(10H)-1-benzopyrano-[3,2-c]-pyridine by method B 1.0 gm of 4a-hydroxy-8-methyl-1,2,3,4,4a,10a-hexahydro-(10H)-1-benzopyrano-[3,2-c]-pyridine was dissolved in 25 cc of acetone, and the solution was stirred at room temperature for 6 hours together with 1.1 gm of potassium carbonate and 0.6 gm methyliodide. The reaction product, 2,8-dimethyl-4a-hydroxy-1,2,3,4,4a,10a-hexahydro-(10H)-1-benzopyrano-[3,2-c]-pyridine, m. p. 155°–157°C., was separated from unreacted starting material by column-chromatography with silicagel-G/methanol. The yield was about 50 percent of theory.

EXAMPLE 26

Preparation of 2-allyl-4a-hydroxy-6-methyl-1,2,3,4,4a,10a-hexahydro-(10H)-1-benzopyrano-[3,2-c]-pyridine by method B 1.0 gm of 4a-hydroxy-6-methyl-1,2,3,4,4a,10a-hexahydro-(10H)-1-benzopyrano-[3,2-c]-pyridine was dissolved in 25 cc of acetone, and the solution was stirred for six hours at room temperature together with 1.1 gm of potassium carbonate and 0.5 gm of allyl bromide. The reaction product, 2-allyl-4a-hydroxy-6-methyl-1,2,3,4,4a,10a-hexahydro-(10H)-1-benzopyrano-[3,2-a]-pyridine, m. p. 99°–101°C. (recrystallized from acetone), was separated from unreacted starting material by column-chromatography with silicagel-G/methanol. The yield was about 60 percent of theory.

The compounds according to the present invention, that is, those embraced by formula I above, have useful pharmacodynamic properties. More particularly, they exhibit antiphlogistic and sedative activities in warm-blooded animals, such as mice and rats, as evidenced by the following pharmacological tests:

SEDATIVE ACTIVITY

The sedative activity was determined on mice in accordance with the standard test method described by Dews in Brit. J. Pharmacol. 8, 46 (1953), which measures the inhibiting effect of the compound under investigation upon the spontaneous motility of the test animals. Adult male laboratory mice of the NMRI-strain with an average body weight of 20 gm were used. The compound under investigation or, in the case of the controls, the corresponding amount of the inert liquid vehicle, was administered 60 minutes prior to the beginning of the measurement of the spontaneous motility by means of an esophageal sound to groups of 10 animals per dose. The spontaneous motility of the mice was measured over a period of 30 minutes. At least three dosage levels were tested for each compound. From the percentage decrease in the motility after administration of the various dosages as against the control animals, the dose which produced a 50 percent inhibition of the spontaneous motility ($ED_{50}$) was determined for each compound by graphic extrapolation.

ANTIPHLOGISTIC ACTIVITY

The antiphlogistic activity was determined as a function of the anti-exudative effect against the carrageenin-edema or kaolin-edema induced in the rat paw, using the standard test methods described by Hillebrecht in Arzneimittel-Forschung 4, 607 (1954), and Winter in Proc. Soc. exp. Biol. Med 111, 544 (1962). The kaolin-edema was artificially induced by means of a subplantar injection of 0.05 cc of a 10 percent suspension of kaolin in an aqueous 0.85 percent solution of sodium chloride; similarly, the carrageenin-edema was induced by subplantar injection of 0.05 cc of a 1 percent solution of carrageenin in an aqueous 0.85 percent sodium chloride solution. The degree of swelling in the rat's paw was measured by means of the technique described by Doepfuer and Cerletti in Int. Arch. Allergy Immunol. 12, 89 (1958). The test animals were adult male laboratory rats of the FW 49-strain having an average body weight of 145 gm.

The compound under investigation was administered to the test animals perorally by means of an esophageal sound as an intimate mixture with methylcellulose. At least 10 animals were used per dose for each compound. The controls received an equal volume of only the methylcellulose used as a vehicle. Each compound was tested at least at three dosage levels and was administered 30 minutes before inducing the kaolin-edema or 60 minutes before inducing the carrageenin-edema, respectively. Five hours after inducing the kaolin-edema or 3 hours after inducing the carrageenin-edema the measurement of the degree of swelling was made which was used as a basis for evaluation of the anti-exudative effect. The median values obtained from the treated animals were compared with those obtained from the control group, and by graphic extrapolation the dose was determined which produces a 35 percent reduction of the swelling ($ED_{35}$).

ACUTE TOXICITY

The acute toxicity of the compounds under investigation was determined by oral administration to adult male laboratory mice of the NMRI-strain having an average body weight of 20 gm or to adult male laboratory rats of the FW 49-strain having an average body weight of 135 gm. The compounds were administered by means of an esophageal sound as an intimate mixture with methylcellulose. At least ten animals were used per dose.

The calculation of the dose which caused 50 percent of the animals to perish within seven days after administration thereof ($LD_{50}$) was carried out pursuant to Litchfield and Wilcoxon (J. Pharmacol. exper. Therap. 96, 99 [1949]).

The following table shows the results obtained.

| Compound | Sedative Activity in the mouse $ED_{50}$ in mg/kg p.o. | Antiphlogistic Carra-geenin-edema rat $ED_{35}$ mg/kg p.o. | Activity Kaolin-edema rat $ED_{35}$ mg/kg p.o. | Acute Toxicity $LD_{50}$ mg/kg p.o. mouse rat |
| --- | --- | --- | --- | --- |
| 2,8-Dimethyl-4a-hydroxy-1,2,3,4,4a,10a-hexahydro-(10H)-1-benzopyrano-[3,2-c]-pyridine (Example 11) | 15.6 | | | 550 |
| 2-(2-Phenylethyl)-4a-hydroxy-8-methyl-1,2,3,4,4a,10a-hexahydro-(10H)-1-benzopyrano-[3,2-c]-pyridine (Example 4) | 19.8 | | | 3980 |
| 2-Allyl-4a-hydroxy-6-methyl-1,2,3,4,4a,10a-hexahydro-(10H)-1-benzopyrano-[3,2-c]-pyridine (Example 1) | | 39.0 | | 536 |
| 2-Propargyl-4a-hydroxy-6-methyl-1,2,3,4,4a,10 a-hexahydro-(10H)-1-benzopyrano-[3,2-c]-pyridine (Example 26) | | | 90.0 | |
| 4a-Hydroxy-6-methyl-1,2,3,4,4a,10a-hexahydro-(10H)-1-benzopyrano-[3,2-c]-pyridine (Example 2a) | | | 56.0 | |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.83 to 5.0 mgm/kg body weight.

The following examples illustrate a few dosage unit compositions comprising a compound of the instant invention as an active ingredient and represent the best mode contemplated of putting the invention to practical use. The parts are parts by weight unless otherwise specified.

EXAMPLE 27

Tablets

The tablet composition was compounded from the following ingredients:

| | |
| --- | --- |
| 2-Allyl-4a-hydroxy-6-methyl-1,2,3,4,4a,10a-hexahydro-(10H)-1-benzopyrano-[3,2-c]-pyridine | 250.0 parts |
| Secondary calcium phosphate | 230.0 parts |
| Corn starch | 200.0 parts |
| Gelatin | 10.0 parts |
| Carboxymethyl cellulose, high viscosity | 5.0 parts |
| Magnesium stearate | 5.0 parts |
| Total | 700.0 parts |

Compounding Procedure

The benzopyranopyridine compound was intimately admixed with the calcium phosphate and the corn starch, the mixture was moistened with an aqueous 7.5 percent solution of the gelatin, and the moist mass was forced through a 1.5 mm-mesh screen. The moist granulate thus obtained was dried at 45°C., again passed through the screen and admixed with the carboxymethyl cellulose and the magnesium stearate. The finish composition was pressed into 700 mgm-tablets. Each tablet contained 250 mgm of the benzopyranopyridine compound and, when administered perorally to a warm-blooded animal of about 60 kg body weight in need of such treatment, produced very good antiphlogistic effects.

EXAMPLE 28

Coated Pills

The pill core composition was compounded from the following ingredients:

| | |
| --- | --- |
| 2-Propargyl-4a-hydroxy-6-methyl-1,2,3,4,4a,10a-hexahydro-(10H)-1-benzopyrano-[3,2-c]-pyridine | 100.0 parts |
| Lactose | 128.0 parts |
| Cellulose, microcrystalline | 60.0 parts |
| Polyvinylpyrrolidone | 8.0 parts |
| Magnesium stearate | 4.0 parts |
| Total | 300.0 parts |

Compounding Procedure

The benzopyranopyridine compound was intimately admixed with the lactose and the cellulose, the mixture was moistened with an aqueous 7.5 percent solution of the polyvinylpyrrolidone, the moist mass was forced through a 1.5 mm-mesh screen, the granulate thus obtained was dried at 45°C. and again passed through the screen. The dry granulate was admixed with the magnesium stearate, and the mixture was pressed into 300 mgm-pill cores which were then coated with a thin shell consisting essentially of sugar and talcum and finally polished with beeswax. Each coated pill contained 100 mgm of the benzopyranopyridine compound and, when administered perorally to a warm-blooded animal of about 60 kg body weight in need of such treatment, produced very good antiphlogistic effects.

EXAMPLE 29

Suppositories

The suppository composition was compounded from the following ingredients:

| | |
|---|---|
| 2-Cyclopropylmethyl-4a-hydroxy-6-methyl-1,2,3,4,4a,10a-hexahydro-(10H)-1-benzopyrano-[3,2-c]-pyridine | 300 parts |
| Cocoa butter | 1460 parts |
| Total | 1760 parts |

Compounding Procedure

The finely pulverized benzopyranopyridine compound was stirred, with the aid of an immersion homogenizer, into the cocoa butter which had been melted and cooled to 40°C. The mixture was cooled to 37°C. and was then poured into cooled suppository molds, each holding 1,760 mgm of the mixture. Each suppository contained 300 mgm of the benzopyranopyridine compound and, when administered by the rectal route to a warm-blooded animal of about 60 kg body weight in need of such treatment, produced very good sedative effects.

EXAMPLE 30

Suspension

The suspension was compounded from the following ingredients:

| | |
|---|---|
| 1Allyl-4a-hydroxy-6-methyl-1,2,3,4,4a,10a-hexahydro-(10H)-1-benzopyrano-[3,2-c]-pyridine | 4.0 parts |
| Methylcellulose | 1.0 parts |
| Colloidal silicic acid | 0.5 parts |
| Sorbitol | 10.0 parts |
| Sodium cyclamate | 0.2 parts |
| Polyethylene sorbitan monooleate | 0.1 parts |
| Benzoic acid | 0.1 parts |
| Caramel flavoring | 0.1 parts |
| Distilled water | 89.0 parts |
| Total | 105.0 parts |

Compounding procedure

The methylcellulose was dissolved in about one-third of the indicated amount of distilled water while vigorously stirring. The remaining distilled water was heated to 70°C., and the benzoic acid, the sorbitol and the polyethylene sorbitan monooleate were dissolved therein. The resulting solution was cooled to room temperature, the sodium cyclamate was dissolved therein, and then the benzopyranopyridine and the colloidal silicic acid were successively suspended in the solution with the aid of an immersion homogenizer. The resulting suspension was added to the aqueous methylcellulose solution while stirring, and the mixture was again homogenized. Finally, the caramel flavoring was added. 5 cc of the finished suspension contained 200 mgm of the benzopyranopyridine compound and, when administered perorally to a warm-blooded animal of about 60 kg body weight in need of such treatment, produced very good antiphlogistic effects.

EXAMPLE 31

Hypodermic Solution

The solution was compounded from the following ingredients:

| | |
|---|---|
| 1Allyl-4a-hydroxy-6-methyl-1,2,3,4,4a,10a-hexahydro-(10H)-1-benzopyrano-[3,2-c]-pyridine | 100.0 parts |
| 1N hydrochloric acid ad pH 2.7 | 400.0 parts by vol. |
| Sorbitol | 100.0 parts |
| Distilled water q.s.ad | 5000.0 parts by vol. |

Compounding Procedure

The benzopyranopyridine compound and the sorbitol were dissolved in a sufficient amount of the distilled water acidified with the hydrochloric acid. Thereafter, the solution was diluted with additional distilled water to the indicated volume and filtered until free from suspended particles. The filtrate was filled into white 5 cc-ampules, which were sealed and then sterilized at 120°C. for 20 minutes. Each ampule contained 100 mgm of the benzopyranopyridine compound, and when the contents thereof were administered by intramuscular injection to a warm-blooded animal of about 60 kg body weight in need of such treatment, very good antiphlogistic effects were produced.

EXAMPLE 32

Syrup

The syrup was compounded from the following ingredients:

| | |
|---|---|
| 2,8-Dimethyl-4a-hydroxy-1,2,3,4,4a,10a-hexahydro-(10H)-1-benzopyrano-[3,2-c]-pyridine | 1.5 parts |
| Tartaric acid | 1.0 parts |
| Benzoic acid | 0.2 parts |
| Polyvinylpyrrolidone | 2.0 parts |
| Glycerin | 10.0 parts |
| Sorbitol | 30.0 parts |
| Yellow food color | 0.002 parts |
| Orange flavoring | 0.1 parts |
| Distilled water | 70.198 parts |
| Total | 115.0 parts |

Compounding Procedure

The distilled water was heated to 70°C., and then the benzoic acid, the tartaric acid, the benzopyranopyridine compound, the food color, the polyvinylpyrrolidone and the sorbitol were successively dissolved therein. The resulting solution was cooled to room temperature, and the glycerin and the flavoring were added thereto. 5 cc of the finished syrup contained 75 mgm of the benzopyranopyridine compound and, when administered perorally to a warm-blooded animal of about 60 kg body weight in need of such treatment, produced very good sedative effects.

Although the above dosage unit composition examples illustrate only a few compounds of the present invention as active ingredients, it should be understood that any other compound embraced by formula I may be substituted for the particular benzopyranopyridine compound in Examples 27 through 32. Moreover, the amount of active ingredient in these examples may be varied to achieve the dosage unit range set forth above, and the amounts and nature of the inert pharmaceutical carrier ingredients may be varied to meet particular requirements. In addition, a dosage unit composition according to the present invention may also comprise one or more other active ingredients having the same spectrum of activity or other spectra of activity.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. 2-allyl-4a-hydroxy-6-methyl-1,2,3,4,4a,10a-hexahydro-(10H)-1-benzo-pyrano[3,2-c]pyridine.
2. 2-propargyl-4a-hydroxy-6-methyl-1,2,3,4,4a,10a-hexahydro-(10H)-1-benzopyrano[3,2-c]pyridine.
3. 2-cyclopropylmethyl-4a-hydroxy-6-methyl-1,2,3,4,4a,10a-hexahydro-(10H)-1-benzopyrano[3,2-c]pyridine.
4. 2-($\beta$-phenethyl)-4a-hydroxy-8-methyl-1,2,3,4,4a,10a-hexahydro-(10H)-1-benzopyrano[3,2-c]pyridine.

* * * * *